(12) United States Patent
Cline et al.

(10) Patent No.: US 8,818,949 B2
(45) Date of Patent: Aug. 26, 2014

(54) SYSTEMS AND METHODS FOR MIGRATING DATABASE DATA

(75) Inventors: Richard Cline, Austin, TX (US);
William J. Pothoff, Austin, TX (US);
Thomas G. Price, Austin, TX (US)

(73) Assignee: BMC Software, Inc., Houston, TX (US)

( * ) Notice: Subject to any disclaimer, the term of this patent is extended or adjusted under 35 U.S.C. 154(b) by 250 days.

(21) Appl. No.: 13/341,676

(22) Filed: Dec. 30, 2011

(65) Prior Publication Data
US 2013/0173546 A1 Jul. 4, 2013

(51) Int. Cl.
*G06F 17/30* (2006.01)

(52) U.S. Cl.
CPC .................................. *G06F 17/30575* (2013.01)
USPC ......................................................... 707/638

(58) Field of Classification Search
CPC .......................... G06F 17/303; G06F 17/30575
USPC ......................................................... 707/638
See application file for complete search history.

(56) References Cited

U.S. PATENT DOCUMENTS

| | | | |
|---|---|---|---|
| 6,289,357 B1 * | 9/2001 | Parker | 707/610 |
| 6,304,882 B1 | 10/2001 | Strellis et al. | |
| 6,973,491 B1 | 12/2005 | Staveley et al. | |
| 7,092,969 B2 * | 8/2006 | Meek et al. | 1/1 |
| 7,480,643 B2 | 1/2009 | Barsness et al. | |
| 7,809,763 B2 * | 10/2010 | Nori et al. | 707/802 |
| 7,962,458 B2 | 6/2011 | Holenstein et al. | |
| 8,037,056 B2 | 10/2011 | Naicken et al. | |
| 8,301,593 B2 | 10/2012 | Hoffmann et al. | |
| 8,433,684 B2 * | 4/2013 | Ruiz Munoz | 707/649 |
| 2005/0131970 A1 * | 6/2005 | Salazar et al. | 707/205 |
| 2006/0136443 A1 | 6/2006 | Dulay et al. | |
| 2006/0190497 A1 | 8/2006 | Inturi et al. | |
| 2006/0190503 A1 | 8/2006 | Naicken et al. | |
| 2007/0150488 A1 * | 6/2007 | Barsness et al. | 707/100 |
| 2008/0189498 A1 | 8/2008 | Brown | |
| 2009/0313311 A1 | 12/2009 | Hoffmann et al. | |
| 2010/0191884 A1 | 7/2010 | Holenstein et al. | |
| 2011/0093440 A1 | 4/2011 | Asakura et al. | |

OTHER PUBLICATIONS

Oracle Database Backup and Recovery User's Guide: "Duplicating a Database", Published Aug. 10, 2007 Website: http://docs.oracle.com/cd/E16655_01/backup.121/e17630/rcmdupdb.htm.*
European Search Report for European Application No. 12194440.9, dated Apr. 29, 2013, 3 pages.
European Search Report for European Application No. 12194448.2, dated Jun. 4, 2013, 4 pages.

(Continued)

*Primary Examiner* — Sheree Brown
(74) *Attorney, Agent, or Firm* — Brake Hughes Bellermann LLP

(57) ABSTRACT

In one general aspect, a computer-implemented method for migrating data from a source database to a target database includes a computer-implemented method that includes executing, using at least one processor, instructions recorded on a non-transitory computer-readable storage medium. The method includes ensuring that the source database has correct version information, creating an image copy of the data in the source database, and collecting metadata describing the source database. The metadata may include information used to verify that the target database is compatible with the source database, to automatically translate object identifiers, and to avert the migration if no data has changed in the source and the target databases (e.g., table and index spaces) since a previous migration. The method may further include refreshing the data in the target database using the image copy after determining that the source database and the target database are compatible.

28 Claims, 7 Drawing Sheets

(56) References Cited

OTHER PUBLICATIONS

Roberts, "DB2 for z/OS Utilities Best Practices, Part 2", Jun. 2011, XP-002696807, 24 pages.

Lane, "Alter Table lock strength reduction patch is unsafe", PostgreSQL, Jun. 16, 2011, XP-002697167, 2 pages.
"Introduction to DB2 for z/OS", IBM, Mar. 2011, 52 pages.
Office Action for U.S. Appl. No. 13/341,693, mailed Nov. 7, 2013, 16 pages.

* cited by examiner

SYSTEMS AND METHODS FOR MIGRATING DATABASE DATA

TECHNICAL FIELD

The subject matter of the present disclosure relates to systems and methods related to copying database instances between platforms.

BACKGROUND

A database is an organized collection of data. Databases commonly organize the data into spaces, tables, indexes, columns, and rows. For example, a column (also referred to as a field) may represent an individual datum, such as a first name or a last name. Columns having some relation are stored together in a table. For example, a first name, last name, birthdate, and address field may be stored together in a table that describes a person. The actual instances of data are stored in a row. In the example above, "Judy" "Smith" "10/2/1975" may be a row in the described table. An index stores a subset of the columns in a table and is used to more quickly access a row of the table. Related indexes are often stored in an index space and tables having some relation are often stored together in a table space. For example, a person table may be stored with a class schedule table and a class history table in an enrollment space for a student at a university, while an admissions space may contain data collected during the admissions process. The structure of the database objects (e.g., the columns, tables, indexes, and spaces) is often stored in a database catalog. The catalog contains data about the objects such as an owner, the format, an object identifier, a date of the last structure change, how the objects are related, etc.

Organizations often keep multiple instances of data for various purposes. For example, it is a common practice to have a production version of a database and a test version of the same database. The test version may be used by the organization's application developers or quality assurance testers to create data for test cases used to debug and test the applications under development. In other situations, an organization may have a day-old (or week-old) copy of a production database that is used for training or for generating reports so that such activities do not impact the data and response time for users of the production database. In most cases, such additional database instances have the same or almost the same table structure as the production database.

To populate an additional database instance from an original database (i.e., the source), an organization may unload the data from the original database into a flat file, and then use the flat file to reload the additional database instance (i.e., the target). This method can be version agnostic because the columns of the source table can be rearranged, massaged, or otherwise converted into the format of the target table. However, the unload/reload process is slow and processor intensive, making the process expensive. Furthermore, the practice usually requires that the indexes be rebuilt to maintain consistency with the data. This incurs more processor time and, thus, more expense.

To avoid the costs associated with the unload/reload approach for data migration, database administrators may use an image copy approach. Image copies of a database are a snapshot in time of the data in the database and are often used for recovery purposes (e.g., for recovering a table that has become corrupted). Utilities for creating an image copy of a database are typically installed with the database. While creation of an image copy and the migration of the copy to the target database are relatively fast, the use of this process for data migration has been limited. For example, for a successful data migration from an image copy, the source and target tables must have compatible column definitions and the version information must be complete. If the column definitions or version information are not compatible, the data will not migrate correctly into the target database. Furthermore, object identifiers must be translated manually, a process prone to typographical errors and other mistakes. For these reasons, image copies are not typically used for data migration from, for example, a production to a test environment.

Thus, a need exists for a system and method for populating additional instances of a database with an image copy that reduces manual input, reduces processing time, and increases successful migration outcomes.

SUMMARY

In one general aspect, a computer-implemented method for migrating data from a source database to a target database includes executing, using at least one processor, instructions recorded on a non-transitory computer-readable storage medium, and includes creating an image copy of data in the source database and collecting metadata describing the source database. The method also includes using the metadata to ensure the source database and the target database are compatible and refreshing data in the target database using the image copy of the data in the source database when the source database and the target database are compatible.

Implementations can include one or more of the following features. For example, the method may also include determining whether any changes to data occurred in the target database or the source database since a previous migration and averting the refreshing when it is determined that no data changes occurred in the target database and no data changes occurred in the source database. In other implementations the method may include translating source object identifiers to target object identifiers based on the metadata as part of the refreshing. In yet other implementations the method may also include determining whether a one-to-one relationship exists between objects in the metadata and objects in the target database as part of using the metadata, for each table object identified in the metadata, determining whether a value calculated based on columns included in the source table object matches a value calculated based on columns included in the target table object, and averting the refreshing when a one-to-one relationship does not exist or the calculated values do not match. In some embodiments the method may include ensuring that the source database has correct version information for the source database before creating the image copy of the data in the source database and automatically repairing the version information of the target database when it is determined that the version information of the target database is not compatible with the version information of the source database.

In another general aspect, a computer-readable storage device can be configured to store instructions that when executed cause a processor to perform a process. The instructions can include instructions to create an image copy of data in the source database and collect metadata describing the source database. The instructions also includes instructions to use the metadata to ensure the source database and the target database are compatible and refresh data in the target database using the image copy of the data in the source database when the source database and the target database are compatible.

In yet another general aspect, a computer-implemented method includes executing, using at least one processor, instructions recorded on a non-transitory computer-readable storage medium, and includes determining whether a table associated with a source database has been changed since a most recent alter of the database. The method also includes performing an update on the table when it is determined that the table has not been changed since the most recent alter and performing a rollback on the table after the update. In some embodiments, the method may include creating an image copy of the data in the source database and refreshing data in the target database with the image copy of the data in the source database.

The details of one or more implementations are set forth in the accompanying drawings and the description below. Other features will be apparent from the description and drawings, and from the claims.

DETAILED DESCRIPTION

The systems and methods described herein can be used to facilitate a database migration using an image copy of the data, rather than a process that unloads and reloads the data. The migration can be achieved, for example, by creating an export file of metadata that describes the attributes of the image copy and the database structures contained within the image copy and by using the export file to verify that the source and target spaces are compatible, avoid an unnecessary migration, automatically verify that the target database has correct version information, and perform automatic object identifier translation. This technique frees the database manager from having to manually provide the information needed to use an image copy for data migration, thus eliminating the possibility of introducing typographical errors that will inhibit the successful use of the image copy.

A database migration system is described herein that can provide for an efficient, fast, and error-reduced data migration that minimizes the amount of data supplied by a database manager while increasing successful migration outcomes. Specifically, before creating an image copy of a database, the system ensures that the copy will have correct version information and gathers data that can be used for mapping spaces from the source database to the target database as well as for averting a data migration or an index rebuild when appropriate.

Figure 1:
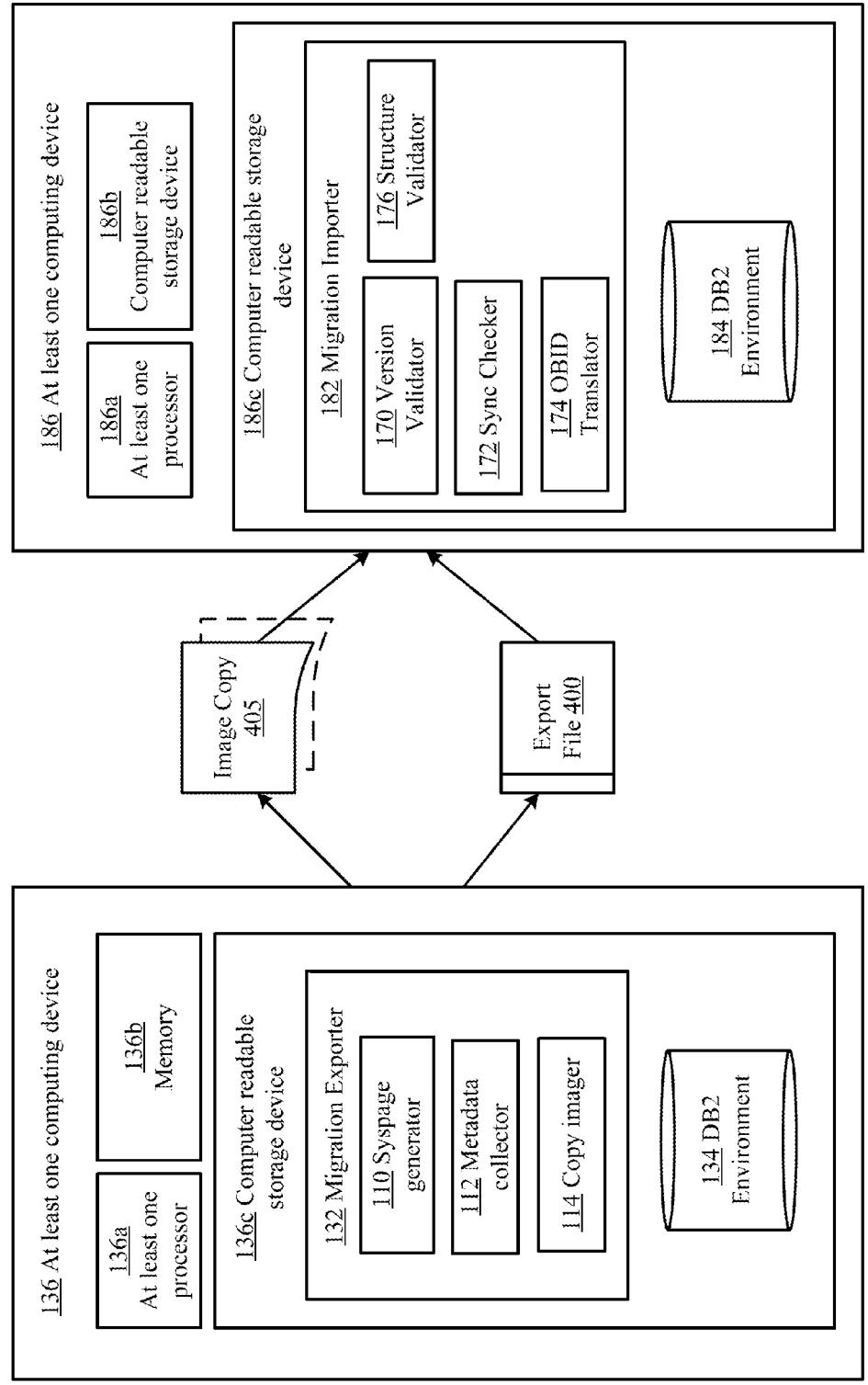
FIG. 1 is a block diagram that illustrates a database migration system for migrating image copy data from a source database to a target database, according to an implementation.

FIG. 1 is a schematic diagram that illustrates an image copy data migration system 100 (also referred to herein as "data migration system" or "database system"). The data migration system 100 can be embodied, for example, on one or more source computing devices 136 and one or more target computing devices 186. The data migration system 100 can be, for example, a server that includes one or more computing devices 136 and 186. Alternatively, one server may include computing device 136 and a second server may include computing device 186. Computing devices 136 and 186 may be in communication with each other via a communications network (not shown). For example, the network can be wired or wireless and can include, a local area network (LAN), a wide area network (WAN), etc. implemented using, for example, gateway devices, bridges, switches, and/or so forth. The network can include one or more segments and/or can have portions based on various protocols such as Internet Protocol (IP) and/or a proprietary protocol. The network can include at least a portion of the Internet. In some implementations, the network can include multiple computing devices (such as computing devices 136 and 186) and/or multiple server devices (not shown).

The computing device 136 can include one or more processors 136a configured to execute one or more machine executable instructions or pieces of software, firmware, or a combination thereof. The computing device 136 can include, an operating system (not shown) and one or more computer memories 136b, such as a main memory, configured to store one or more pieces of data, either temporarily, permanently, semi-permanently, or a combination thereof. The memory 136b may include volatile memory, non-volatile memory, or a combination thereof. The computing device 136 can also include one or more storage mediums 136c, such as a non-transitory computer-readable storage disk configured to store data in a semi-permanent or substantially permanent form.

In some implementations, the computing device 136 may include one or more other hardware components not shown in FIG. 1, such as for example, a display or monitor, a keyboard, a touchscreen, a camera, a mouse, a touchpad, a trackpad, a video processor, etc.

The data migration system 100 also includes a database 134 stored in one or more of storage mediums 136c (e.g., disk, tape, main memory) of the electronic device 136. The database 134 can be any database storing any type of data. In some implementations, the database 134 is a DB2 database. Storage medium 136c may also store a migration exporter 132. Migration exporter 132 may include instructions that, when executed by the one or more of processors 136a, cause computing device 136 to perform certain functions. For example, migration exporter 132 may include instructions to ensure that database 134 has correct version information, to generate information about the objects that comprise database 134, and to gather information about prior migrations of data from database 134, if any. For example, migration exporter 132 may include module 110 that ensures that database 134 has correct version information. In implementations where database 134 is a DB2 database, module 110 may include a system page generator that determines whether system pages need to be generated and automatically generates the system pages for the DB2 database. Migration exporter 132 may also include module 112 that gathers metadata about database 134, and module 114 that creates an image copy of the data in database 134.

Migration exporter 132 may generate a metadata export file 400 and one or more image copy files 405. The image copy files 405 may be of a single table or of a space (a collection of tables) and created by a utility of database 134. The metadata export file 400 may be created by, for example, metadata module 112. Export file 400 and image copy 405 may be stored on a computer-readable storage device that is accessible by both computing device 136 and computing device 186. In other implementations, export file 400 and image copy 405 may be transferred from computing device 136 to computing device 186 over a network.

The computing device 186 can include one or more processors 186a configured to execute one or more machine executable instructions or pieces of software, firmware, or a combination thereof. The computing device 186 can include, an operating system (not shown) and one or more computer memories 186b, such as a main memory, configured to store one or more pieces of data, either temporarily, permanently, semi-permanently, or a combination thereof. The memory 186b may include volatile memory, non-volatile memory or a combination thereof. The computing device 186 can also include one or more storage mediums 186c, such as a non-transitory computer-readable storage disk configured to store data in a semi-permanent or substantially permanent form.

In some implementations, the computing device 186 may include one or more other hardware components not shown in FIG. 1, such as for example, a display or monitor, a keyboard, a touchscreen, a camera, a mouse, a touchpad, a trackpad, a video processor, etc.

The computing device 186 may also include a database 184 stored in one or more of storage mediums 186c (e.g., disk, tape, main memory) of the electronic device 186. The database 184 can be any database storing any type of data. In some implementations the database 184 is a DB2 database. Database 184 may be an instance of database 134 (i.e., a test version of production database 134).

Storage medium 186c may also store a migration importer 182. Migration importer 182 may include instructions that, when executed by one or more of processors 186a, cause computing device 186 to perform certain functions. For example, migration importer 182 may include instructions to validate the version information and structure of database 184, to avert migration if a migration is not needed, and to translate object identifiers. For example, migration importer 182 may include module 170 that checks the version information of the target database 184 and automatically repairs the version information if needed. In implementations where database 184 is a DB2 database, module 170 may include instructions to determine whether a REPAIR VERSION command is needed after migrating the image copy data. Migration importer 184 may also include module 172 that determines whether the data in the source database and the target database has changed before allowing the migration to complete. Migration importer 184 may also include module 174 that automatically translates the object identifiers in the image copy 405 from the source object identifiers to the target object identifiers. Migration importer 184 may also include module 176 that maps the source database objects (e.g., tables, indexes) in image copy 405 to target objects in database 184 and verifies that the structure of the source tables is the same as the structure of the target tables.

Figure 2:
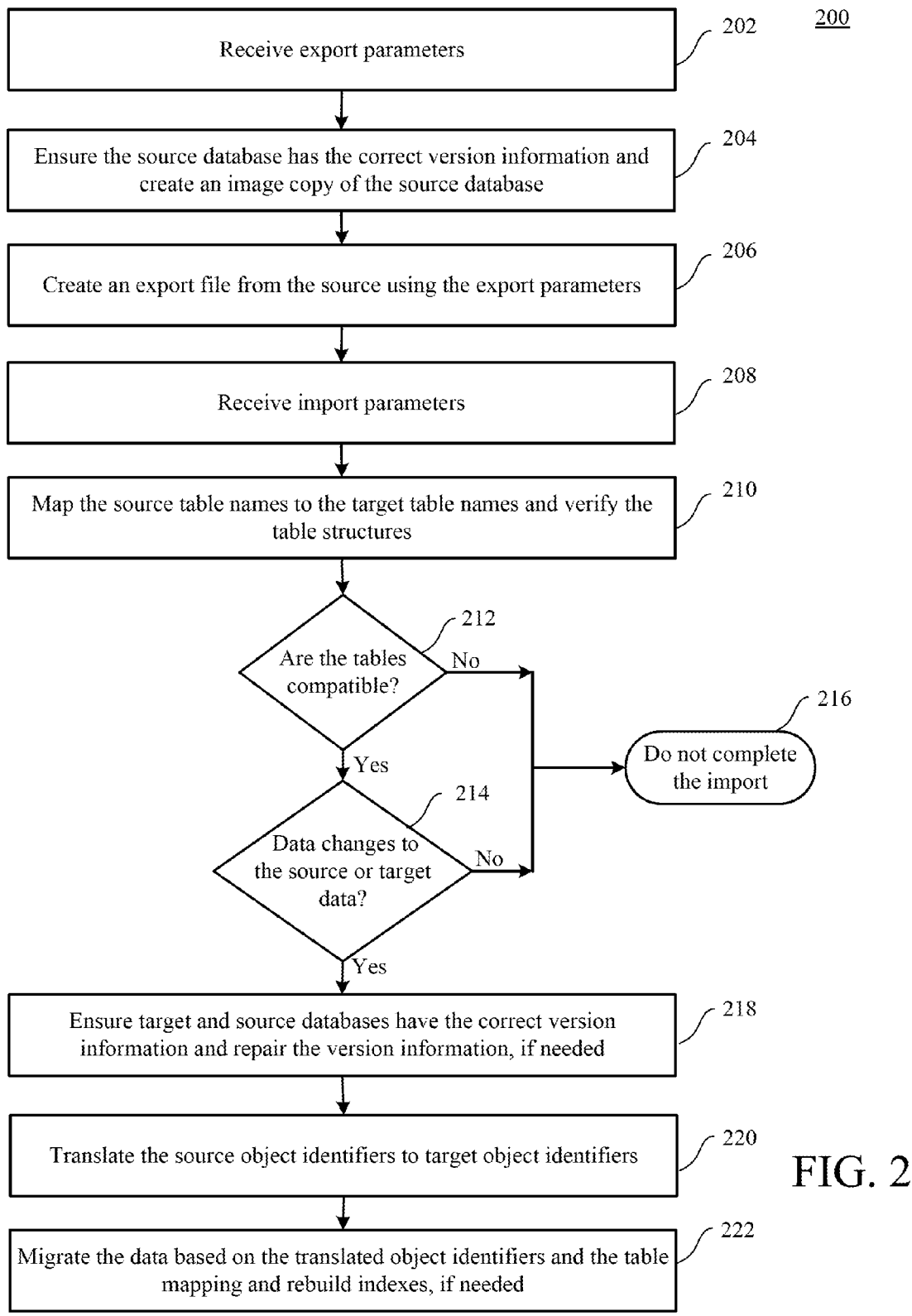
FIG. 2 is a flowchart illustrating a process of migrating data from a source database to a target database using an image copy and a metadata export file, according to an implementation.

FIG. 2 is a flowchart of a method 200 for migrating image copy data from a source database to a target database using a metadata export file in the data migration system 100. Steps 202 to 206 may be performed by a source computing device, such as device 136. Steps 208 to 222 may be performed by a target computing device, such as device 186. As shown in FIG. 1, both computing device 136 and computing device 186 may be part of data migration system 100.

At 202, data migration system 100 may receive export parameters from a database manager. For example, in some instances the parameters may include the name of the table space or table in the source database to be exported. A migration may be done for a table, a table space, an entire database, or a set of databases. In addition, the parameters may include the name of the metadata export file and/or the location where the export file is to be stored. In some implementations, the data migration system 100 may provide a default name for the metadata export file based on the objects to be included in the migration.

At 204, the data migration system 100 may ensure that the source database has the correct version information. Version information may be kept in database system files. For example, in embodiments where the source and the target databases are DB2 databases, the database system stores version information in the catalog. The catalog is one or more files that contain information about the structure of a database space. For example, the catalog may store the column definitions and their arrangement within a table, and may store the table information by table space. When the data migration system 100 makes an image copy of the database, such as image copy 405, the version information may be incorporated into the image copy. If the version information is incorrect in the image copy, incompatibilities between the source and the target databases (e.g., the table spaces and/or index spaces) cannot be correctly repaired. In some instances, the system pages on the source database become obsolete after an alter command is performed on a table in the database. An alter command causes one or more of the columns in a table to change (e.g., adds a column, deletes a column, changes the size of a column) and may also add tables or indexes to a space. In a DB2 system, new system pages or index directory pages are not written to the table space or index space until an update or insert is performed. Thus, there can be a period of time when the version information in the table space or index space is not complete.

Figure 3:
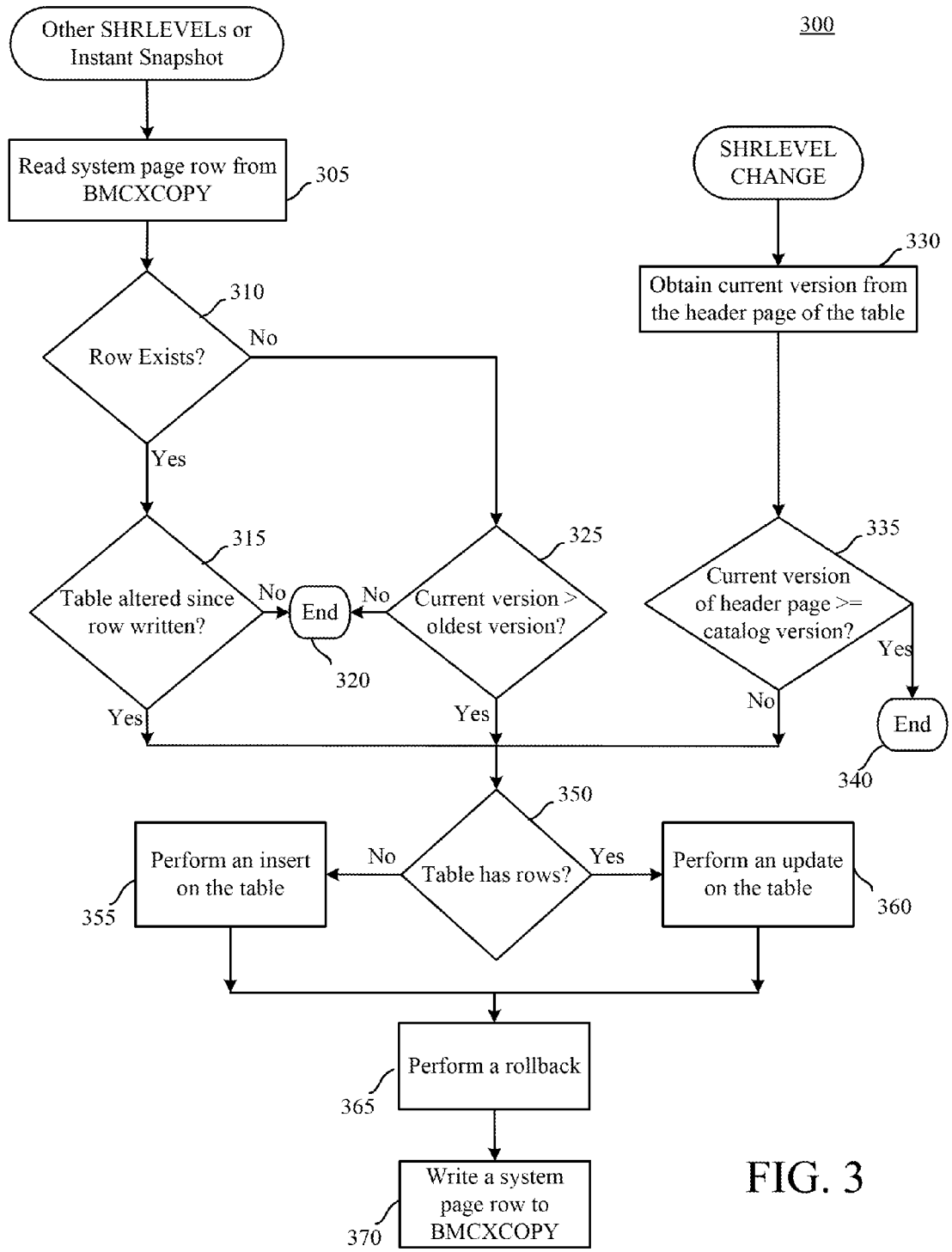
FIG. 3 is a flowchart illustrating a process of ensuring that the source database has the correct version information, according to an implementation.

FIG. 3 is a flowchart illustrating a process 300 of ensuring that the source database (e.g., table spaces and index spaces) has the correct version information. Data migration system 100 may use process 300 to make sure that the image copy of the source database contains correct version information. Although FIG. 3 illustrates an implementation for a DB2 database, those of ordinary skill in the art will understand that the principles may be applied to other database systems that store version information in system files. Furthermore, although FIG. 3 illustrates creating system pages for a table space, similar principles apply to creating index directory pages for an index space. Accordingly, FIG. 3 is not limited to creating system pages for a DB2 table space.

In a DB2 implementation, there are multiple options for creating an image copy. Depending on the option used, data migration system 100 may use different methods to determine whether new system pages (or index directory pages) need to be generated. For example, system 100 may write a row to a file, such as a system file (e.g., BMCXCOPY), each time the system pages or index directory pages are generated. The row may indicate the date that the system pages were created. System files such as BMCXCOPY and SYSCOPY are tables in the database catalog and contain information needed for recovery. At 305, data migration system 100 may read the system page row from the system file. If no such row exists in the system file (310, No), data migration system 100 may determine whether the current version is older than the oldest version at 325. The oldest version and the current version may be obtained from the catalog for the database, such as a table space or index space (e.g., SYSIBM.SYSTA-BLESPACE). If not (325, No), data migration system 100 need not generate system pages and the process ends at 320. If the current version is more recent than the oldest version, system 100 may generate the system pages to ensure that correct version information is included in the image copy of the source database.

If a system page row does exist (310, Yes), then at 315 data migration system 100 may determine whether the space has been altered since the row was written. Data migration system 100 may determine the date of the last alter by obtaining the last alter date of the table (or index) in the database catalog (e.g., SYSIBM.SYSTABLES). If the space has not been altered (315, No), then data migration system 100 need not generate system pages and the process ends at 320. If the space has been altered (315, Yes), then data migration system 100 should create the system pages.

After determining that system pages should be created, data migration system 100 may force the creation of system pages by performing either an insert or an update on the a table associated with the database (e.g., table space or index space). An insert is needed because when a table is empty, an update on the table may not result in the creation of system pages and index directory pages. Alternatively, updates are needed because performing an insert that results in a duplicate key may not result in the creation of system pages and index directory pages. Thus, at 350, data migration system 100 may determine whether an update or an insert is more appropriate by determining whether a table in the table space has rows. If the space (e.g., a table) has rows (350, Yes), then at 360 the data migration system 100 may perform an update of one of the rows. If the space does not have rows (350, No), then at 355 the data migration system 100 may perform an insert.

At 365 the data migration system 100 may rollback the insert or the update, as appropriate, so that the data in the source database is not affected by the creation of system pages. Because the database system creates the system pages based on the successful update or insert, a rollback does not affect the created system pages. In some embodiments, the data migration system 100 may write a system page row to the system file (such as BMCXCOPY) at 370. In some implementations, writing a row to the system file may be accomplished automatically as part of the process that creates the system pages. Process 300 then ends, having forced the creation of system pages. Data migration system 100 may repeat process 300 for each table in each space to be included in the migration, as needed.

In other DB2 embodiments, where a database manager requests a SHRLEVEL CHANGE copy, the data migration system 100 may have already read the header page for a table. In such an embodiment, at 330, the data migration system 100 may obtain the current version of the table from the header page. In a DB2 system a header page is the first page in a table and contains information relating to the entire table, including the version. At 335, data migration system 100 may obtain the version information from the catalog and compare this with the version obtained from the table. If the version obtained from the table is greater than the current version in the catalog (335, Yes), then system 100 does not need to generate system pages and process 300 ends at 340. But if the version in the header page is less than the version in the catalog (335, No), system 100 should generate system pages. System 100 may generate the system pages using steps 350 to 370 as discussed above.

Returning to FIG. 2, at 204 data migration system 100 may also create an image copy of the source database. Data migration system 100 may create the image copy using utilities supplied with the database. For example, in a DB2 embodiment, a database manager may issue a COPY TABLESPACE command. The COPY command may include a SHRLEVEL REFERENCE option and a GROUP YES option to ensure that each object in the image copy has been made consistent as of the time of the COPY command.

Figure 4:
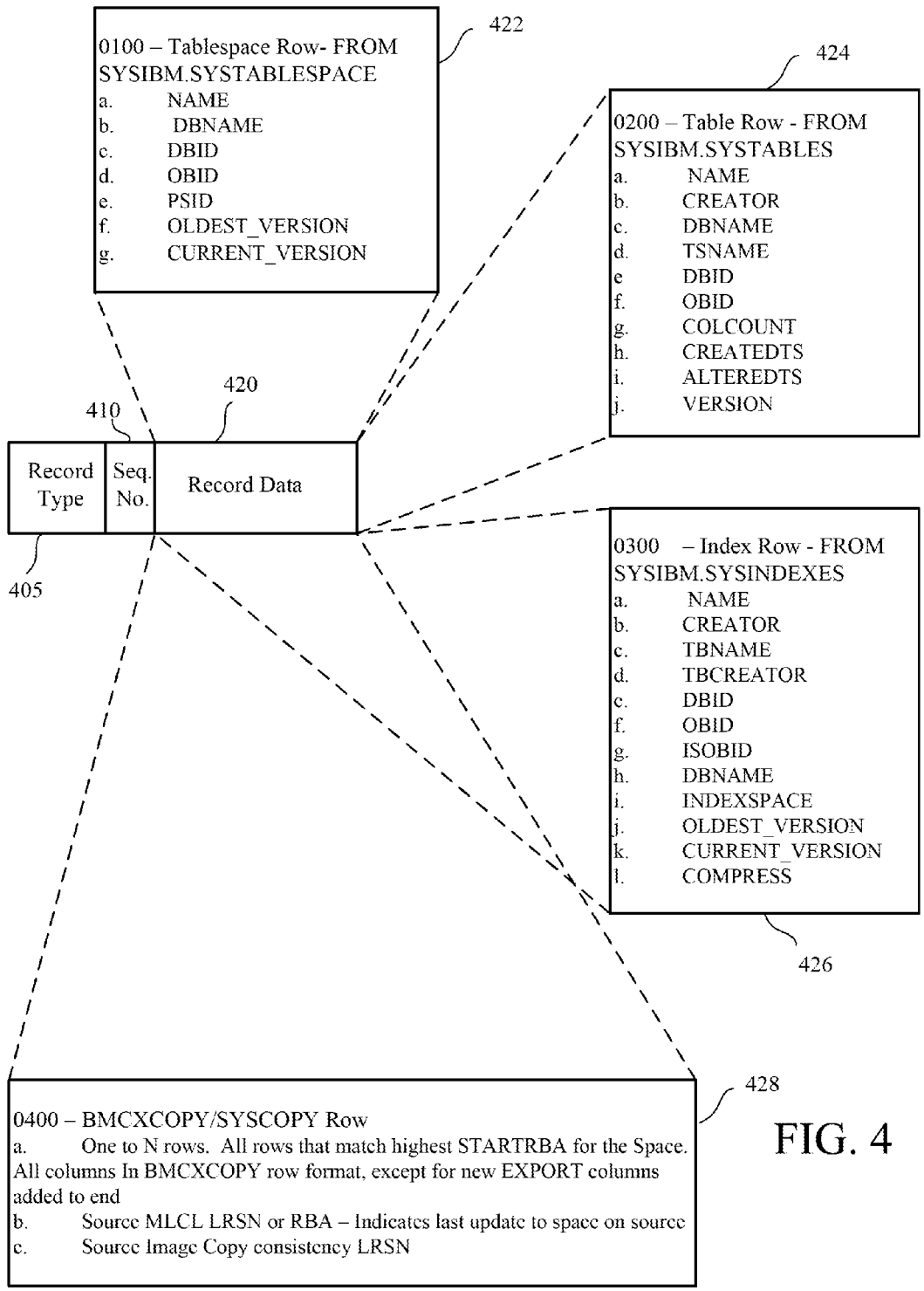
FIG. 4 is an example of a record structure for a metadata export file, according to an implementation.

At 206 the data migration system 100 may create an export file containing metadata about the source database based on the export parameters. The export file, such as file 400, may contain the information about the source data needed to minimize manual input during a migration of the data to a target database. FIG. 4 is an example of a metadata export file, according to an implementation. In some embodiments the metadata export file may be a variable length BSAM file, which is a type of sequential file. The export file may contain a record type 405, a sequence number 410, and record data 420. Record type 405 may indicate the type of data stored in record data 420. The record type 405 may be a number or character sequence. For example, as shown in FIG. 4, record type 405 may be a four digit number, although embodiments are not limited to such a combination. In the example of FIG. 4, a record type of 0100 may indicate that record data 420 contains metadata about a table space, a record type of 0200 may indicate that record data 420 contains metadata about a table, a record type of 0300 may indicate that record data 420 contains metadata about an index, and a record type of 0400 may indicate that record data 420 contains metadata about system files, such as BMCXCOPY or SYSCOPY. Sequence number 410 may optionally be included to assist in browsing the export file. Record data 420 may vary, as discussed above, based on the record type 405. The data included in each record type may be extracted from the database catalog tables or calculated based on data from the catalog or from system files.

In one embodiment, record data 420 for a table space may contain the fields shown in record 422. For example, the table space metadata may include the name of the table space, the database name of the table space, the database identifier (DBID), the object identifier (OBID) of the table space, the page set identifier (PSID), the oldest version of the table space, and the current version of the table space. A record data 420 for a table may contain the fields shown in record 424. For example, the table metadata may include the table name, the table creator, the database name, the table space name, the DBID, the table OBID, a column count, the date the table was created, the date the table was last altered, and the version (from the catalog). In some embodiments, the column count may be the number of columns in the table. In other embodiments, the column count may be a calculated value based on the columns in the table. For example, for each column, data migration system 100 may take the first 2 bytes and the last two bytes of the column name, convert these characters to hexadecimal numbers, translate A-F to 0-5, and multiply this value by the column number. The values calculated for each column in the table may then be added together and this number may be inserted into the export record as the column count. Data migration system 100 may then use the number to validate the table structure of the target database, as will be described in more detail below.

An index row record may contain the fields shown in record 426. For example, the index metadata may include the index name, the index creator, the table name for the index the creator of the table, the database identifier, the index object identifier, the internal index set object identifier, the database name, the index space, the oldest version of the index, the current version of the index, and an index compression flag.

The system file record 428 may contain any additional data that the target computing device needs to verify table or index structure, determine when updates were made to the source table, and otherwise complete the data migration. In some implementations, the actual contents of a system file or table, such as BMCXCOPY or SYSCOPY, are included in the system file record rows. In addition, the system file record may contain the consistency point of the image copy from the source, and the maximum last change logpoint (MLCL) of the image copy from the source, which can be used to determine if the data in the source has changed since the previous migration. Data migration system 100 may store the previous MLCL as a row in a system file or table, such as BMCX-COPY. Data migration system 100 may calculate the current MLCL based on data in the SYSLGRNX and SYSCOPY tables. The SYSLGRNX table stores the relative byte address (RBA) ranges of log records in the DB2 log and the log record sequence number (LRSN) ranges of log records in the DB2 log that can contain changes to tables or indexes in the database. The MLCL of a table space in the current migration may be the greater of the highest log range end-point prior to the consistency point of the migration and the highest start_rba from the SYSCOPY table for a data-updating event to the table space that occurred prior to the image copy consistency point. If the space was open for update at the time of migration, then the data migration system 100 may assign the MLCL of the table space or index space to be the consistency point of the image copy. In some embodiments, an MLCL of an index space may also be determined by analyzing the SYSLGRNX for the associated table space in conjunction with SYSCOPY rows for the table space and index space. In other embodiments, an MLCL of an index space may be inherited directly from the associated table space.

Those of ordinary skill in the art will realize that although the export file 400 of FIG. 4 has been discussed with regard to implementation on a DB2 database, similar concepts may apply to other types of database systems and embodiments are not limited to DB2 implementations.

As described above, steps 202 to 206 may be performed, for example, at a source computing device, such as computing device 136. At the conclusion of step 206, the data migration system 100 may have created an export file 400 and an image copy file 405. In other embodiments, the export file and the image copy may be in one file. In some embodiments, the export file and the image copy may be transferred to a target computing device, such as device 186. In other embodiments a target computing device may have access to a storage location of the export file and the image copy. The target computing device may then perform steps 208 to 222 to complete the migration of data from the source database to the target database.

At 208, data migration system 100 may receive import parameters for initiating an import process that completes the migration of data from the source database to the target database. The parameters may include the name and location of the export file and image copy file and the name of the tables or table spaces to be migrated. In other instances, the parameters may include instructions on how to convert the table names and index names in the source database to match the table names and index names in the target system. Such instructions may be referred to as matching rules. A matching rule may apply to table names, index names, or owner names. For example, a parameter of "OWNER PROD* TEST*" may indicate that source tables belonging to an owner name beginning with "PROD" should match to target tables belonging to an owner name beginning with "TEST." As another example, "TB PROD*PAY TEST*PAY" may indicate that source tables having names beginning with "PROD" and ending with "PAY" should map to target tables having names beginning with "TEST" and ending with "PAY." Such conversion instructions may be stored in a text file and the location of the text file may be passed to data migration system 100. In other embodiments, the conversion instructions may be provided at a command prompt. In yet other embodiments, the conversion instructions may be received with the export parameters and included in the export file.

In yet other embodiments, the conversion instructions and other parameters may be provided through a user interface provided by data migration system 100. The user interface may prompt the database manager for the name and location of the export file and provide an area to specify an object type, a source pattern, and a target pattern for matching rules. Wildcard characters, such as the asterisk (*), question mark (?), percent sign (%), or underscore (), may be used in the source pattern and the target pattern to represent a single character or zero or more characters. The user interface may also provide a sample matching algorithm. The sample matching algorithm may attempt to match each table in the export file with the specified target space using the parameters entered by the user. If a one-to-one match is not made, the user interface may alert the database manager so that adjustments can be made before actually beginning the export process.

At 210, data migration system 100 may begin the migration import process by mapping the source table names to the target table names and verifying that the table structures are compatible. As part of the mapping process data migration, system 100 may create a temporary database table from the information contained in the metadata export file. This may enable the data migration system 100 to more easily access the data in the export file and to ensure that the source objects map one-to-one to the target objects.

Figure 5:
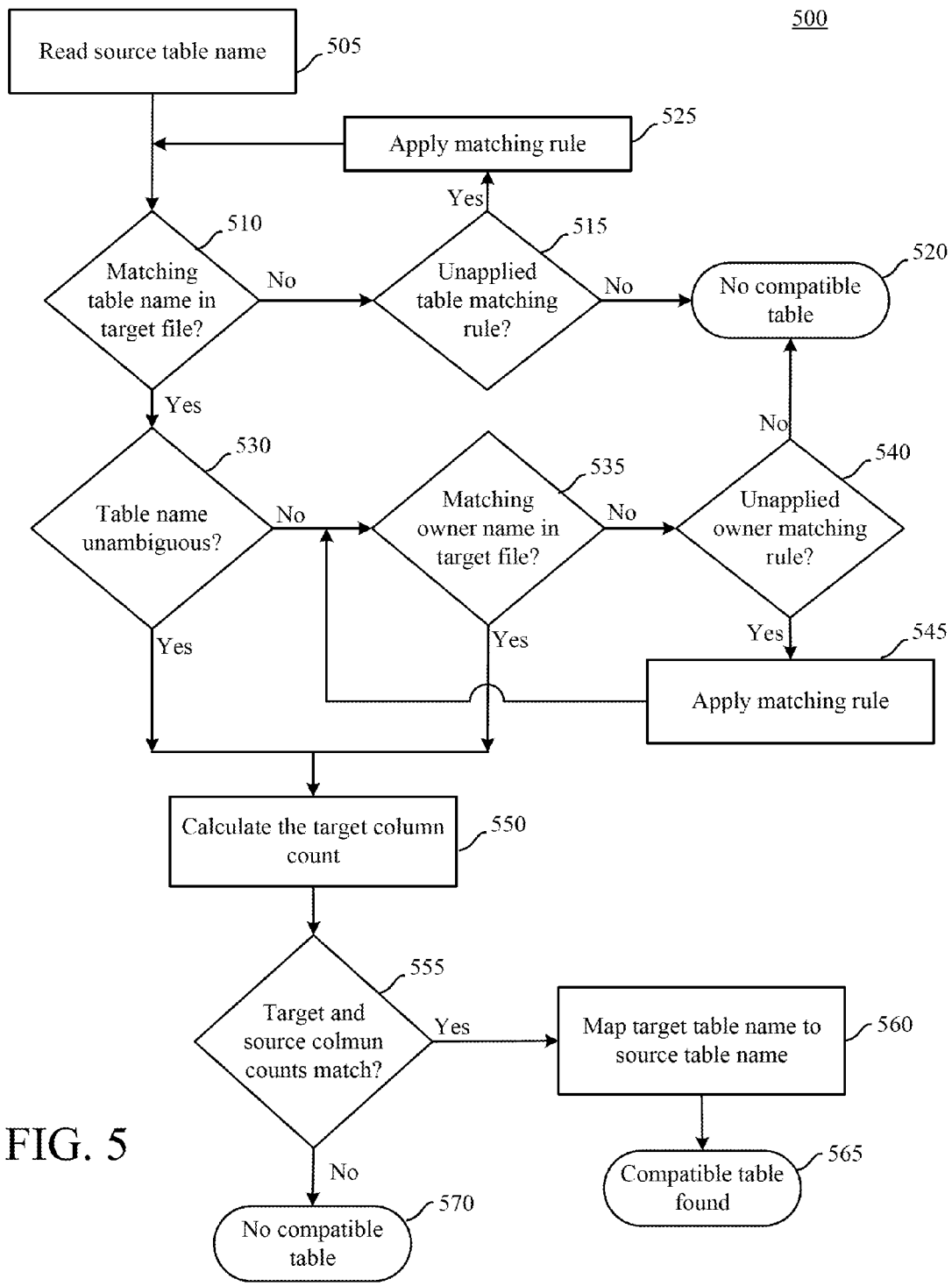
FIG. 5 is a flowchart illustrating a process for mapping source objects to target objects and verifying the table structures, according to an implementation.

FIG. 5 is a flowchart illustrating a process 500 for mapping source objects to target objects and for verifying the compatibility of the source and target table structures, according to some implementations. Data migration system 100 can use process 500 to perform the mapping before beginning the refreshing of the target database with the image copy file. Although depicted as matching table names, those of ordinary skill will understand that other objects, such as indexes or table spaces, may be mapped in a similar manner. At 505, data migration system 100 may read a source table name, for example, from the metadata export file 400 or from the temporary database file created from the export file. As discussed above, a table record may be one of the record types included in the metadata export file.

At 510, data migration system 100 may look for a matching target table name in the target database. Target table names may be in the catalog of the target database (e.g., the SYSTABLES file). If a target table with a matching table name is found (510, Yes), then data migration system 100 may determine whether the target database contains more than one table having a matching table name. If only one table matches (530, Yes), then data migration system 100 has found a potentially matching table. However, if a matching target table name is not found in the target database catalog (510, No), data migration system 100 may look for unapplied table matching rules. As discussed above, a database manager may supply table matching rules when initiating the import. If an unapplied table matching rule is found (515, Yes), then, at 525, data migration system 100 may apply the rule and repeat step 510 using the matching rule. If no unapplied table matching rules exist (515, No), then data migration system 100 has failed to find a matching target table. In some implementations, data migration system 100 informs the database manager that no matching table could be found for the source table name and process 500 ends.

If matching tables were found using the matching rules, data migration system 100 again determines whether the target database contains more than one matching target table. If more than one target table matches the source table (530, No), then, at 535, data migration system 100 may use the owner of the table to determine which of the two target tables to pick. If the owner name of one of the tables matches the owner name of the source table (535, Yes), then data migration system 100 has found a potential matching table. If none of the owner names match (535, No), then, at 540, data matching system 100 may look for unapplied owner matching rules. If an unapplied rule exists (540, Yes), data matching system 100 may apply the rule at 545 and repeat step 535 using the matching rule to match the owner names. If no other owner matching rules exist (540, No), then data migration system 100 has failed to find a matching target table and process 500 may end.

If data migration system 100 finds a potentially matching table then, at 550, data migration system 100 calculates the target column count for the potentially matching table. As described above, a column count may be the number of columns in the table. In other embodiments, the column count may be a value calculated based on columns included in the target table object, as described above, for example, with regard to record 424 of FIG. 4.

At 555, if the target column count matches the source column count (which may be included in a table record in the export file), then data migration system 100 maps the target table to the source table at 560. For example, data migration system 100 may create or update a temporary database table that stores the mapping. The mapping may include the table spaces, owners, names, and object identifiers of the source and target tables. Data migration system 100 may use this information to translate source object identifiers in the image copy to the correct target object identifiers, as explained in more detail below with regard to FIG. 7. If the target column counts do not match the source column counts (555, No), then although the table names match, the structures differ and the tables are not compatible. As described above, data migration system 100 may issue a warning to the database manager that a compatible table was not found and, thus, a one-to-one table mapping failed. Data migration system 100 may repeat process 500 for each database object in the export file as part of step 210 of FIG. 2.

At 212 of FIG. 2, the data migration system 100 may determine whether the source and target tables and other database objects are compatible. For example, after attempting to match and verify all objects, when unmatched objects exist in the export file (212, No) then, at 216, data migration system 100 may alert the database manager to any unmatched objects and terminate the data migration (i.e., the import), thus averting a data migration that would not be successful. As described above, even if a potentially matching table exists, the tables may not be compatible because of differences in table structure (e.g., number of columns, length of columns, column names, etc.). In some embodiments a target table that contains a column that does not exist in the source table may still be compatible with the source table for migration purposes. In such an embodiment, the column may be left out of the column count calculation at the target.

If the objects in the export file map one-to-one to objects in the target database then, at 214, data migration system 100 may determine whether the source data or the target data has experienced changes since the previous migration. For example, in some implementations a data migration takes place at a regular interval, such as daily or weekly. If no changes have been made to either the source data or the target data since the prior migration another migration is not needed. Therefore data migration system 100 may avert an unnecessary migration, when appropriate.

Figure 6:
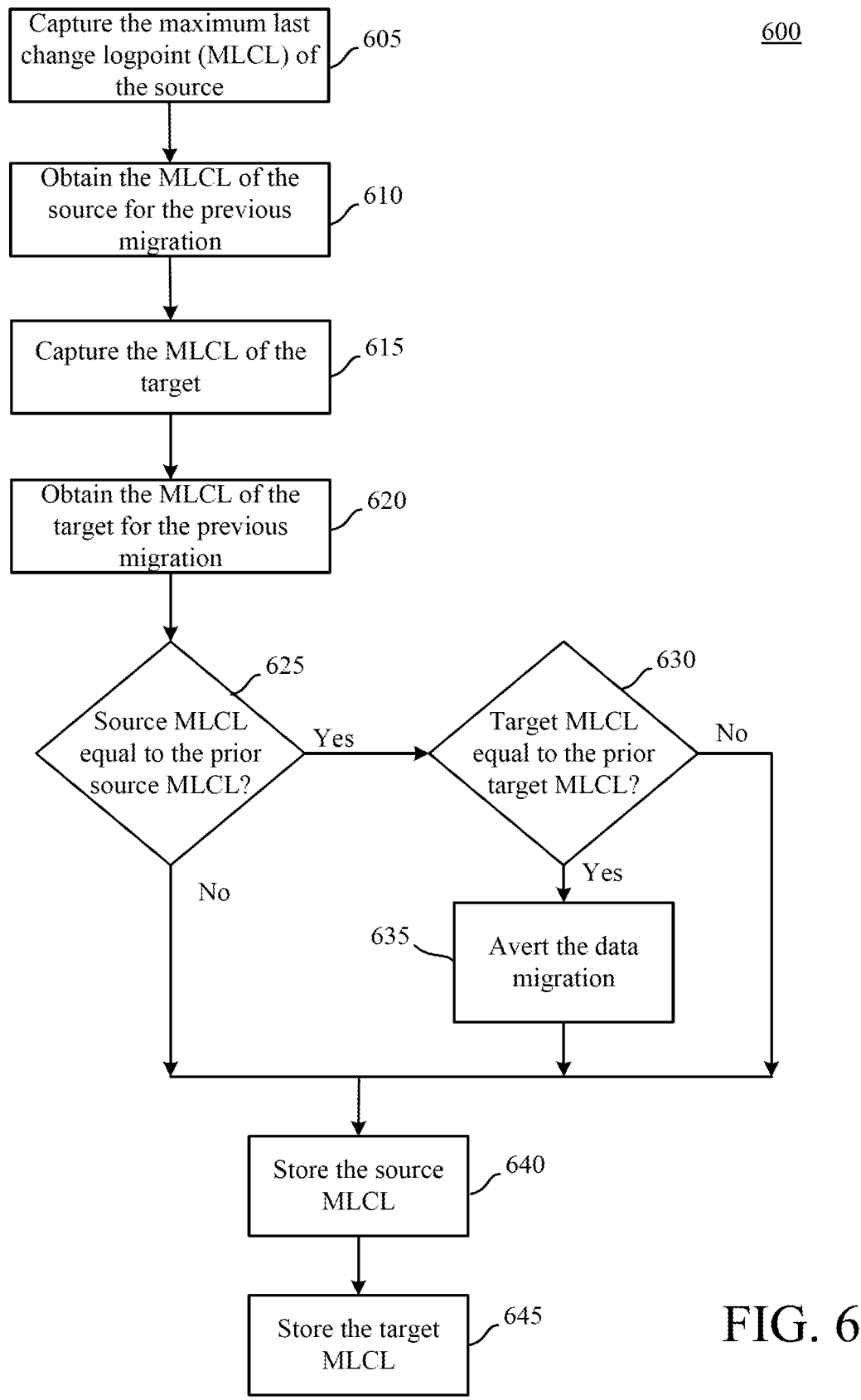
FIG. 6 is a flowchart illustrating a method of determining whether changes have been made to the source data or the target data since the previous migration, according to an implementation.

FIG. 6 is a flowchart illustrating a method 600 of determining whether changes have been made to the source data or the target data since the previous migration, according to an implementation. Data migration system 100 may use process 600 to avert an unnecessary data migration, thus saving system time and system resources. Process 600 enables data migration system 100 to determine that the contents of the different image copies of the source are identical without actually reading the image copies or log files. Because image copies and log files are often very large being able to calculate the most recent change in an image copy, table space, or index space without actually having to access the copy or log files provides a significant performance advantage over traditional comparison methods.

At 605, data migration system 100 may capture the maximum last change logpoint (MLCL) of the data contained in the image copies of the source database. As described above with regard to record 428 of FIG. 4, the system 100 may calculate the maximum last change logpoint for the current migration based on data available in the SYSLGRNX and SYSCOPY tables. At 610, the data migration system 100 may obtain the MLCL of the migration just prior to the current migration. In some embodiments, the prior MLCL may be stored in a system file or table at the target system and, as described below, updated each time a migration is performed. In some implementations data migration system 100 may include the current MLCL of the source database in the metadata export file, for example, in the system file record 428.

At 615, the data migration system 100 may capture the current MLCL of the target data. As with the source MLCL, the current MLCL of the target data may be calculated based on information in the system tables, such as SYSLGRNX and SYSCOPY, that record the logpoint (RBA or LRSN) of changes to the target table space or index space. The MLCL of the current migration may be the greater of the highest log range end-point prior to the log point of the migration and the highest start_rba from the SYSCOPY file for a data-updating event. If the space was open for update at the time of migration, then the data migration system may set the MLCL of the target table space or index space to high values. At 620, the data migration system 100 may obtain the MLCL of the target at the point of the previous migration. Normally, this would be the logpoint of the prior migration on the target. The target MLCL for the previous migration may also be stored in a system file or table, as described above.

At 625, the data migration system 100 may compare the source MLCL for this migration to the source MLCL of the prior migration. If the two values are equal (625, Yes), then data migration system 100 may compare the target MLCL for the current migration to the target MLCL at the point of the prior migration (at 630). If current MLCL values for both the target and source match the MLCL values for the prior migration (630, Yes) then, at 635, data migration system 100 may avert the data migration. In other words, if the data contained in the current image copy of the source is identical to the data contained in the image copy of the source that was used for the prior migration and no data has changed on the target since the last migration then data migration system 100 may bypass using the image copy to refresh the target database. Regardless of whether the data has changed, at 640, data migration system 100 may store the source MLCL for the current migration. In some embodiments step 640 may be performed at the target computing device so that the value is stored in a target system file or table so it may be accessed the next time a data migration occurs at the target. In some embodiments, this value may replace the MLCL of the source for the prior migration. In other embodiments, the value is stored in addition to the MLCL of the source for the prior migration (i.e., a log of all MLCL values are stored with a timestamp of the migration). In other embodiments step 640 may be performed at the source computing device, such as device 136 as part of the export process. At 645 the data migration system 100 stores the MLCL of the target for the current migration, in a manner similar to that discussed above with regard to the source MLCL. Process 600 may then end.

Going back to FIG. 2, if data migration system 100 determines that no data changes have been made (214, No), then the import of the image copy is bypassed (at 216). Otherwise, at 218, data migration system 100 may ensure that the target database has the correct version information. For example, data migration system 100 may obtain version information for the source table space from the export file and compare it with version information in the target database. If necessary, in some DB2 implementations, data migration system 100 may issue a REPAIR VERSION command to ensure version compatibility. In other embodiments, if a prior data migration has not occurred the data migration system 100 may issue a REPAIR VERSION command. Because correct system pages were generated in the source database before creating the image copy, the REPAIR VERSION command should be successful.

Figure 7:
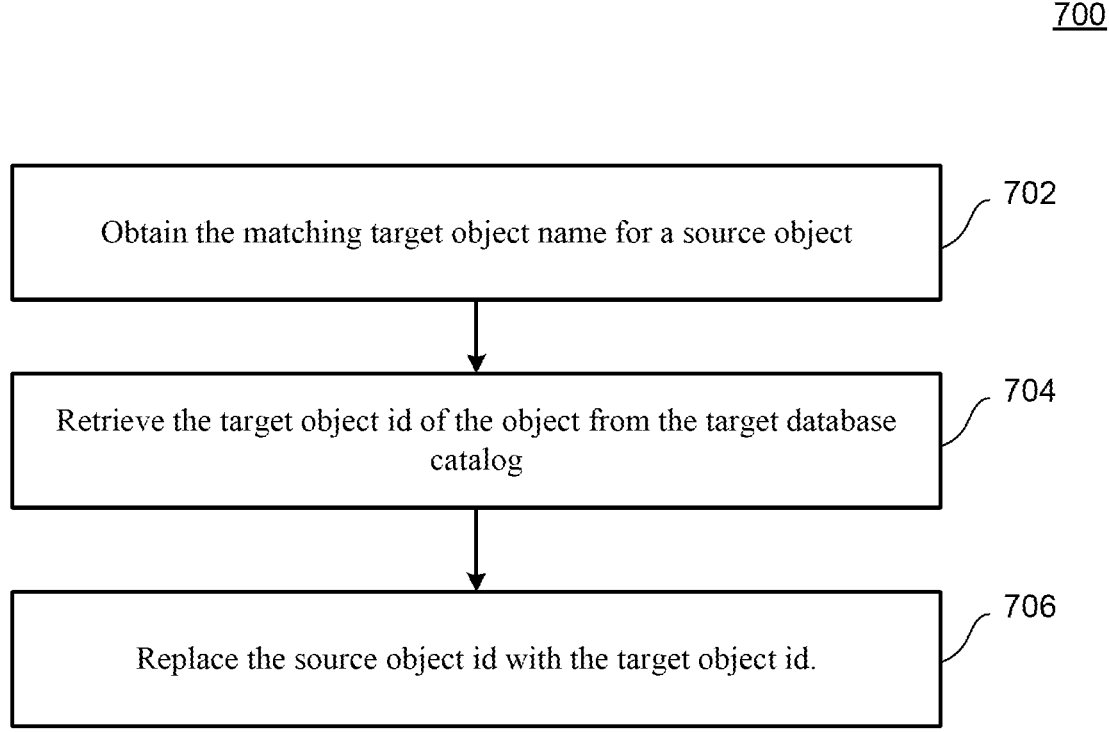
FIG. 7 is a flowchart illustrating a method of translating object source identifiers and target object identifiers, according to an implementation.

At 220, the data migration system 100 may translate the source object identifiers in the image copy to target object identifiers. In some embodiments, data migration system 100 may use the mapping file created in step 210. If the mapping file does not contain the information needed to translate the object identifiers, data migration system 100 may use a process such as the process illustrated in FIG. 7. For example, as shown in FIG. 7, at 702, data migration system 100 may obtain the matching target object name for a source object. At 704, data migration system 100 may retrieve the target object identifier of the object from the target database catalog. In other words, data migration system 100 may look up the target object in the catalog and retrieve the object identifier stored with the catalog. Whether the target object was in the mapping file or recently retrieved from the catalog, at 706, data migration system 100 may replace the source object identifier in the image copy with the target object identifier. Such automatic translation of object identifiers ensures that the identifiers are translated correctly and eliminates the possibility of introducing typographical errors.

Returning to FIG. 2 at 222, the data migration system 100 may proceed to refresh the target database using the image copy that has been modified based on the object identifier translation. After migrating the data using the image copy, process 200 may end.

It should be noted that some embodiments do not require the creation of a metadata export file. In such embodiments data migration system 100 may collect the information for the source database (e.g., table spaces, index spaces, tables, indexes, etc.) directly from the system files or tables when as is needed during the import rather than reading it from the metadata export file. For example, when data migration system 100 includes a source database and a target database on the same subsystem (e.g. both the target and the source reside on computing device 136) the source and the target data may reside in the same database catalog and system files. In such an embodiment, it may not be necessary to read the catalog for the source, build the metadata, and store it in a file because data migration system 100 could read the data directly when needed during the import process. Such an embodiment may occur when the source and target database reside in the same DB2 subsystem. Even if the source and target do not reside in the same subsystem, such as when the source and target databases reside in different DB2 subsystems but on the same MVS LPAR, the data migration system 100 may still be able to access both the source and target database systems without the need to transfer a metadata file from a source system to a target system.

Additionally, even if the source and target databases reside on separate computing devices (e.g., different DB2 subsystems and different MVS LPARs), if the migration importer of data migration system 100 has access to the system files or tables of the source database, it may access these tables directly rather than having to use a metadata export file. For example, the target system may have access via a distributed data facility (DDF) to the source system and, therefore, access to the source files and/or tables. Accordingly, the target system may request the type of data contained in the metadata export file directly from the source system itself.

Implementations of the various techniques described herein may be implemented in digital electronic circuitry, or in computer hardware, firmware, software, or in combinations of them. Implementations may implemented as a computer program product, i.e., a non-transitory computer program tangibly embodied in an information carrier, e.g., in a machine-readable storage device (e.g., a computer-readable medium, a tangible computer-readable medium), for processing by, or to control the operation of, data processing apparatus, e.g., a programmable processor, a computer, or multiple computers. In some implementations, a non-transitory tangible computer-readable storage medium can be configured to store instructions that when executed cause a processor to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) display device, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computer-implemented method of migrating data from a source database to a target database including executing, using at least one processor, instructions recorded on a non-transitory computer-readable storage medium, the method comprising:
   creating an image copy of data in the source database;
   collecting metadata describing structural attributes of the source database;
   using the metadata to ensure a structure of the source database and a structure of the target database are compatible; and
   refreshing data in the target database using the image copy of the data in the source database when the structure of the source database and the structure of the target database are compatible,
   wherein using the metadata to ensure the structure of the source database and the structure of the target database is compatible includes matching a name for a source table from the metadata with a name for a target table in the target database and determining that a value calculated based on columns included in the source table matches a value calculated based on columns included in the target table.

2. The computer-implemented method of claim 1, further comprising:
   determining whether any changes to data occurred in the target database or the source database since a previous migration; and
   averting the refreshing when it is determined that no data changes occurred in the target database and no data changes occurred in the source database.

3. The computer-implemented method of claim 2, wherein determining whether any changes occurred to the source database comprises:
   determining a current maximum last change logpoint for the source database;
   retrieving a prior maximum last change logpoint for the previous migration; and
   determining that no data has changed when the current maximum last change logpoint matches the prior maximum last change logpoint.

4. The computer-implemented method of claim 1, further comprising:
   translating source object identifiers to target object identifiers based on the metadata as part of the refreshing.

5. The computer-implemented method of claim 1, wherein matching the source table name and the target table name comprises:
   matching the source table name from the metadata with the target table name in the target database regardless of whether an owner name of the source table matches an owner name of the target table;
   when no target table matches the source table, applying a table matching rule; and
   when more than one target table name matches the source table name, using an owner matching rule to match the source table with the target table.

6. The computer-implemented method of claim 1, further comprising:
   determining whether a one-to-one relationship exists between objects in the metadata and objects in the target database as part of using the metadata; and
   averting the refreshing when a one-to-one relationship does not exist.

7. The computer-implemented method of claim 1, wherein calculating the value based on columns included in the source table comprises:
   for each column in the source table, translating a number of beginning characters and a number of ending characters into a numeric value and multiplying the numeric value by the column number; and
   summing the result of the multiplying for all columns in the source table.

8. The computer-implemented method of claim 1, further comprising:
   ensuring the source database has correct version information for the source database before creating the image copy of the data in the source database.

9. The computer-implemented method of claim 8, further comprising:
   determining whether version information of the target database is compatible with the version information of the source database; and
   automatically repairing the version information of the target database when it is determined that the version information of the target database is not compatible with the version information of the source database.

10. The computer-implemented method of claim 8, wherein ensuring the source database has correct version information comprises:
  determining whether an update has been performed after an alter of the source database;
  performing an update of a row in the source database when it is determined that an update has not been performed after an alter; and
  performing a rollback of the row after the update.

11. The computer-implemented method of claim 1, wherein the metadata is stored in a file generated by a computer system on which the source database resides.

12. The computer-implemented method of claim 4, wherein translating source object identifiers to target object identifiers includes, for each source object:
  determining a matching target object name for the source object;
  retrieving a target object identifier for the matching target object name from a target database catalog; and
  replacing source object identifiers with the target object identifiers in the image copy.

13. A computer program product, the computer program product being tangibly embodied on a computer-readable storage device storing instructions that when executed cause a processor to perform a process, the instructions comprising instructions to:
  create an image copy of data in a source database;
  collect metadata describing structural attributes of the source database;
  use the metadata to ensure a structure of the source database and a structure of a target database are compatible, including matching a name for a source table from the metadata with a name for a target table in the target database and determining that a value calculated based on columns included in the source table matches a value calculated based on columns included in the target table; and
  refresh data in the target database using the image copy of the data in the source database when the structure of the source database and the structure of the target database are compatible.

14. The computer program product of claim 13, further comprising instructions to:
  determine whether any changes to data occurred in the target database or the source database since a previous migration; and
  avert the refreshing when it is determined that no data changes occurred in the target database and no data changes occurred in the source database.

15. The computer program product of claim 13, further comprising instructions to:
  translate source object identifiers to target object identifiers based on the metadata as part of the refreshing.

16. The computer program product of claim 13, wherein the instructions to match the source table name with the target table name comprise instructions to:
  match the source table name from the metadata with the target table name in the target database regardless of whether an owner name of the source table matches an owner name of the target table;
  when no target table matches the source table, apply a table matching rule; and
  when more than one target table name matches the source table name, use an owner matching rule to match the source table with the target table.

17. The computer program product of claim 13, further comprising instructions to:
  determine whether a one-to-one relationship exists between objects in the metadata and objects in the target database as part of using the metadata; and
  avert the refreshing when a one-to-one relationship does not exist.

18. The computer program product of claim 13, further comprising instructions to:
  ensure the source database has correct version information for the source database before creating the image copy of the data in the source database;
  determine whether version information of the target database is compatible with the version information of the source database; and
  automatically repair the version information of the target database when it is determined that the version information of the target database is not compatible with the version information of the source database.

19. The computer program product of claim 13, further comprising instructions to:
  before creating the image copy of the data in the source database, determine whether an update has been performed after an alter of the source database;
  perform an update of a row in the source database when it is determined that an update has not been performed after an alter; and
  perform a rollback of the row after the update.

20. The computer program product of claim 13, wherein the instructions to calculate the value based on columns included in the source table comprises instructions to:
  for each column in the source table, translate a number of beginning characters and a number of ending characters into a numeric value and multiplying the numeric value by the column number; and
  summing the result of the multiplying for all columns in the source table.

21. The computer program product of claim 15, wherein the instructions to translate source object identifiers to target object identifiers comprises instructions to, for each source object:
  determine a matching target object name for the source object;
  retrieve a target object identifier for the matching target object name from a target database catalog; and
  replace source object identifiers with the target object identifiers in the image copy.

22. A computer system for migrating data from a source database to a target database comprising:
  a source computing system including:
    at least a first processor;
    a source database; and
    memory storing instructions that, when executed by the at least first processor, cause the source computing system to:
      create an image copy of data in the source database,
      create a file of metadata describing structural attributes of the source database; and
  a target computing system including:
    at least a second processor,
    a target database, and
    memory storing instructions that, when executed by the at least second processor, cause the target computing system to:
      use the file of metadata to ensure a structure of the source database and a structure of the target database are compatible, including, for each source table object in the metadata file, determining that a value calculated based on columns included in the source table object matches a value calculated based on columns included in a target table object, wherein when the values do not match the structure of the target database is not compatible with the structure of the source database, refresh data in the target database using the image copy of the data in the source database when the structure of the source database and the structure of the target database are compatible.

23. The computer system of claim 22, the target computing system including further instructions that, when executed by the at least second processor, cause the target computing system to:

translate source object identifiers to target object identifiers based on the metadata as part of the refreshing.

24. The computer system of claim 22, the target computing system including further instructions that, when executed by the at least second processor, cause the target computing system to:

determine whether a one-to-one relationship exists between objects in the metadata file and objects in the target database as part of using the file of metadata; and avert the refreshing when a one-to-one relationship does not exist.

25. The computer system of claim 22, the source computing system including further instructions that, when executed by the at least first processor, cause the source computing system to ensure the source database has correct version information for the source database before creating the image copy of the data in the source database; and the target computing system including further instructions that, when executed by the at least second processor, cause the target computing system to:

determine whether version information of the target database is compatible with the version information of the source database, and automatically repair the version information of the target database when it is determined that the version information of the target database is not compatible with the version information of the source database.

26. The computer system of claim 22, wherein the metadata is stored in a file generated by the source computing system.

27. The computer system of claim 22, wherein calculating the value based on columns included in the source table object comprises:

for each column in the source table, translating a number of beginning characters and a number of ending characters into a numeric value and multiplying the numeric value by the column number; and summing the result of the multiplying for all columns in the source table object.

28. The computer system of claim 23, wherein translating source object identifiers to target object identifiers based on the metadata as part of the refresh comprises, for each source object:

determining a matching target object name for the source object;

retrieving a target object identifier for the matching target object name from a target database catalog; and replacing source object identifiers with the target object identifiers in the image copy.

* * * * *